No. 840,389. PATENTED JAN. 1, 1907.
F. E. SLOAN.
SHEET METAL SASH PULLEY.
APPLICATION FILED APR. 13, 1906.
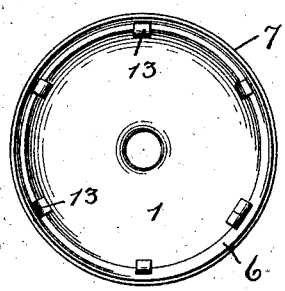
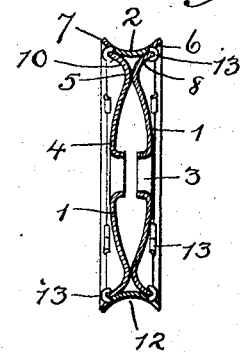
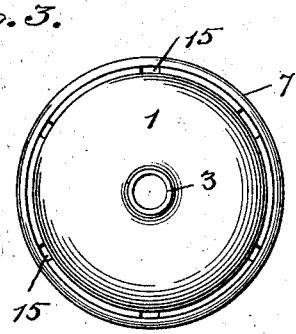
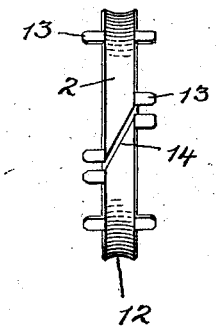
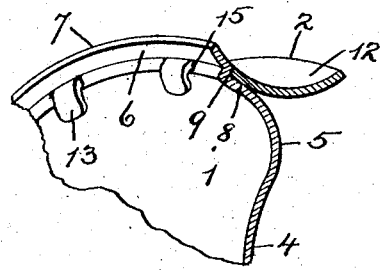
Witnesses
Edwin L. Jewell
G. Ferd. Vogt.
Inventor
Francis Eugene Sloan
By Mann & Co,
Attorneys

UNITED STATES PATENT OFFICE.

FRANCIS EUGENE SLOAN, OF BALTIMORE, MARYLAND.

SHEET-METAL SASH-PULLEY.

No. 840,389.　　　　Specification of Letters Patent.　　　Patented Jan. 1, 1907.

Application filed April 13, 1906. Serial No. 311,452.

*To all whom it may concern:*

Be it known that I, FRANCIS EUGENE SLOAN, a citizen of the United States, residing at Baltimore, in the State of Maryland, have invented certain new and useful Improvements in Sheet-Metal Sash-Pulleys, of which the following is a specification.

This invention relates to improvements in grooved sash-pulleys, and has for its object to provide a sheet-metal pulley of such construction that the side plates will be held together by a tire of improved construction.

The invention is illustrated in the accompanying drawings, in which—

Figure 1 illustrates a side elevation of the pulley. Fig. 2 shows a central cross-section of the same. Fig. 3 illustrates a side elevation of the inner side of one of the side plates. Fig. 4 shows a detail view of the tire, and Fig. 5 illustrates a fragmentary perspective view of a portion of the tire and one side plate secured together.

Referring to the drawings by numerals, 1 designates the two side plates, which form the pulley proper and which are to be secured together by an improved construction of tire or band 2, so that the working face of the pulley will form a smooth concave channel for the flexible connection between the weight and sash to travel over.

Each side plate 1 is stamped from a blank of stiff sheet metal and is provided with a central tubular bearing 3, which projects inwardly from an outwardly bulged or curved central portion 4. Beyond the central curved portion the plates are provided with an inwardly-curved surface 5, and the flanges 6 of the plates extend laterally from said curved surface. The lateral flange of each side plate is provided with an outer circumferential rim edge 7 and an inner circumferential recess 8, with a wall or shoulder 9 between the two.

When the two side plates are fitted together, the inwardly-projecting tubular bearings 3 will confront each other, while the inwardly-curved surfaces 5 will contact, and the flanges 6 will project laterally in opposite directions. If the two side plates were merely placed together as just described and then riveted, an annular V-shaped space 10 would extend circumferentially around the pulley and the pull on the sash-cord would tend to spread the plates apart and by entering or squeezing into said annular space. One object of my invention is to remove this objectionable feature by providing a tire or band which not only serves to bridge over the crack, but which will also serve to hold the two side plates together. This tire 2 is provided with a channel 12, and its opposite rim edges are provided with laterally-projecting tangs 13, by which it is to engage the side plates.

The tire may have split or overlapping ends 14, so that its joint may not extend directly across the concave channel, but diagonally across said channel; but it is to be understood that the invention is not limited in this respect.

When the tire is in position around the lateral flanges of the side plates, it will lie in the circumferential recess 8, so that its outer concave surface will become flush with the upper surface of the rim edge 7, and the circular edges of said tire will confront the wall or shoulder 9 between said rim edge and recess. This wall 9 is provided with a plurality of slots 15, and the tangs 13 on the rim edges of the tire are passed through said slots to the outer side of the lateral flanges, and the outer projecting ends of said tangs are then turned downwardly and clenched beneath said flanges. When all the tangs are thus clenched on the outer side of the flanges, the two side plates will be securely held together and the concave portion of the tire will cover the annular V-shaped space 10, and the downward pull of the cord or chain, which passes around the tire, will serve to draw the two side plates together instead of pressing them apart.

Having thus described my invention, what I claim as new, and desire to secure by Letters Patent, is—

1. In a pulley, the combination with the side plates having laterally-projecting circumferential flanges which are provided with a plurality of slots, of a circumferential tire adjacent said flanges and being of less width than the latter and having a plurality of tangs which project through the slots of said flanges.

2. In a pulley, the combination with the side plates having laterally-projecting flanges which are provided with a circumferential recess and having a plurality of slots around said recess, of a tire of less width than the flanges and extending across the latter between the slots, said tire having a plurality of tangs which project through said slots and are turned against the outer side of said flanges.

In testimony whereof I affix my signature in presence of two witnesses.

FRANCIS EUGENE SLOAN.

Witnesses:
CHARLES B. MANN, Jr.,
PARKER S. BURBANK.